United States Patent Office 3,277,768
Patented Oct. 11, 1966

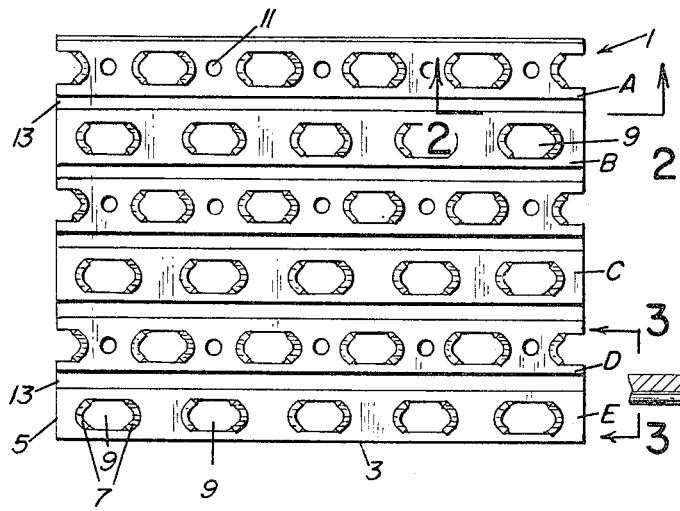
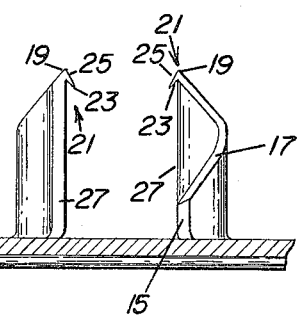
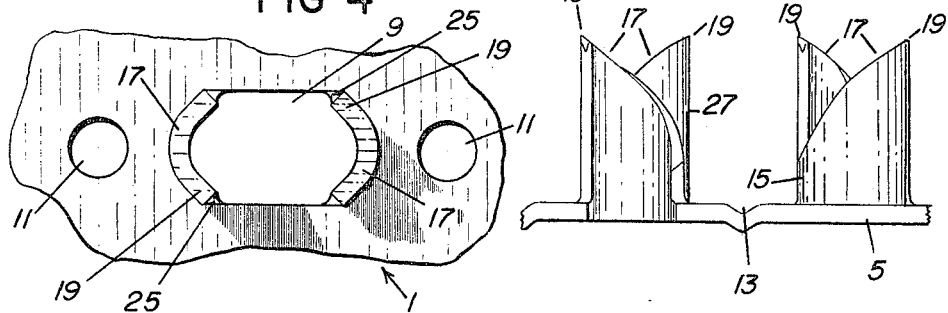
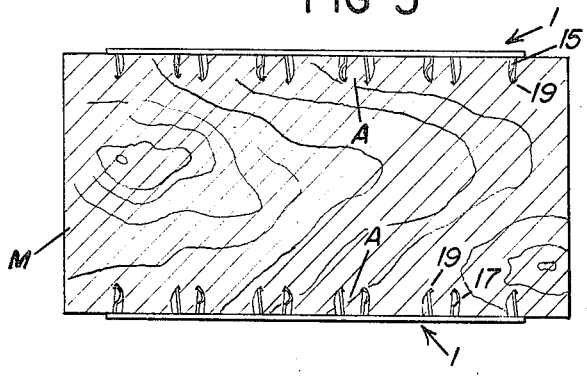

3,277,768
ROLL LOCK TRUSS PLATE
Gail H. Templin and Wesley A. Mills, Vero Beach, Fla., assignors, by mesne assignments, to Gail H. Templin, Vero Beach, Fla.
Filed Feb. 5, 1964, Ser. No. 342,676
1 Claim. (Cl. 85—13)

This invention constitues a continuation-in-part of application Serial No. 246,149, filed December 20, 1962, for Roll Lock Truss Plate, now abandoned.

This invention relates broadly to the art of metallic connecting structures, and in its more specific aspects it relates to a roll lock truss plate in the nature of a connecting plate for connecting the joints of wooden truss members together; and the nature and objects of the invention will be readily recognized and understood by those skilled in the art to which it relates in the light of the following explanation and detailed description of the accompanying drawings illustrating what we at present believe to be the preferred embodiment or mechanical expressions of our invention from among various other forms, arrangements, combinations and constructions, of which the invention is capable within the spirit and scope thereof.

It is conventional practice in the production of wooden structural members such as trusses to provide metallic plates which extend across the joint between adjacent members of the truss to connect these members together to form the completed truss. Many different types of metallic connecting plates have been used in the past, however, it has been our experience that most of the prior art connector plates are deficient for a variety of reasons and do not provide a completed integral truss unit having the necessary strength characteristics and forces resistant to tension and compression. The type of connector plate in which we are particularly interested comprises a generally rectangular metallic plate having a plurality of wood penetrating teeth struck therefrom so that the base of the plate is provided with a plurality of openings therein. The efficiency and connective potential of a plate will be substantially increased in accordance with the number of teeth which are struck therefrom per square inch of the plate. Thus, it has been one of our prime purposes to devise a roll lock truss plate which has a greater number of teeth struck therefrom per square inch than any prior art plate of which we are aware.

We have struck our teeth from the roll lock truss plate in a novel manner so as to produce two teeth from a single opening in the plate and by this novel and ingenious manner of striking and shaping the teeth we provide more teeth per square inch of plate without having to reduce the size of the teeth or without in any manner whatsoever materially weakening the plate.

The roll lock truss plate comprising this invention involves generally a plurality of longitudinally extending transversely spaced rows of wood penetrating teeth which are struck from the body of the plate. The teeth are struck in pairs from the plate and the teeth are so shaped that an elongated opening is proivded between each pair. The points of each pair of teeth are offset with respect to a line extending centrally through the elongated openings which are formed by the struck up teeth, that is the wood penetrating point of one tooth of a pair of teeth is on one side of such center line, while the wood penetrating point of the other tooth is on the opposite side of the center line. This particular shaping and construction of the teeth is significant and endows our roll lock truss plate with certain advantageous features not found in former plates for it tends to reduce the splitting of the lumber into which the plate is forced because the tips or points of the pairs of teeth do not usually fall in line with the grain of the wood of the wooden truss. It will be understood that it is desirable that these teeth do not in all instances fall into line with the grain of the wood.

It has also been one of our purposes to increase the tensile strength across the width or transverse direction of the plate. We have accomplished this purpose by staggering the elongated openings transversely of the plate so that these openings do not appear in an aligned transverse line across the plate. We have not only provided means for adding to the tensile strength of the plate but we have also provided means which will be fully explained hereinafter whereby the transverse rigidity of the plate is substantially increased. As we have hereinbefore stated, the design of roll lock truss plate which is herein involved provides more teeth per square inch than prior art plates without sacrificing an increase in transverse tensile strength of the plate.

We have designed a plate which has no means or structure thereon which has any tendency whatsoever to open the connecting timbers forming tha truss when the plate is pressed into the truss.

The roll lock plate of this invention also allows narrower teeth without sacrificing tooth rigidity which maintains a greater cross sectional area for greater tensile strength.

While the roll lock truss plate described and claimed in our pending application Serial No. 246,149 has been eminently successful, we have devised certain novel structure, which will be explained hereinafter, which improves the holding power of the plate and substantially reduces the tendency of the teeth to tear the wood fibers and produces a cleaner penetration into the wood, with practically no splitting of the wood between the teeth.

In this form of our invention we have provided a sharp edge on that portion of each tooth which first enters the wood in the penetrating operation, which produces the aforementioned cleaner penetration.

We have also so formed the point or end of each tooth so that a spreading action will occur as the teeth are forced into the wood so that a larger area of wood will be positioned between each pair of teeth to thereby substantially increase the holding power of the plates.

The roll lock plate of this invention may be produced with substantial economy and may be applied or connected into operative position within the wooden truss member with little or no difficulty.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:
FIG. 1 is a plan view of our roll lock truss plate.
FIG. 2 is a view taken on the line 2—2 of FIG. 1.
FIG. 3 is a view taken on line 3—3 of FIG. 1.
FIG. 4 is a plan view of one of the pairs of teeth.
FIG. 5 is a section taken through a member of a truss and showing the plates fastened on both sides thereof with the teeth spread.

In the accompanying drawings we have used the numeral 1 to designate in its entirety our roll lock truss plate which is preferably formed of .040 20 gauge galvanized steel and is rectangular shape and may be dimensioned to be suitable for various types of truss installations. The plate 1 has longitudinal edges 3 and transverse edges 5 and is stamped or otherwise formed to provide longitudinal rows A, B, C, D and E of pairs of teeth 7 which are struck from the plate to provide elongated openings 9 between each pair of teeth 7. The longitudinally extending rows of pairs of teeth and openings are alternately arranged transversely of the plate so that an elongated opening of the row A, for instance, will be on a transverse line between or alternated with the elongated opening in the next longitudinal row B. This transversely staggered or alternate arrangement of openings and pairs of teeth is continued throughout the plate. A nail hole 11 is provided between each pair of teeth 7, preferably in every other row, and a longitudinally extending groove 13 is pressed or rolled in the body of the plate 1 and extends between each longitudinally extending row A, B, C, D and E, of elongated openings and pairs of teeth. Reference to FIG. 3 of the drawings clearly illustrates that the longitudinally extending ribs formed by grooves 13 project from the opposite face of the plate 1 from that from which the pairs of teeth 7 project.

Each tooth of each pair of teeth 7 is provided with an arcuately shaped root or base portion 15, and is formed with a diagonally extending wood penetrating edge 17 which extends upwardly from the root portion 15 adjacent one longitudinal edge of the elongated opening 9 and toward the other edge of the elongated opening.

Each diagonally extending wood penetrating edge 17 is subjected to a coining or the like operation which produces a sharp edge along the diagonal edge of each tooth, which is the portion of each tooth which is the first to enter the wood when the roll lock truss plate is forced into operative position at the joint of the truss. We have found that the sharpening of this diagonal tooth edge, which, as as stated, is the first part of the tooth to enter the wood, results in less tearing of the wood fibers and produces a cleaner penetration into the wood, with almost no splitting of the wood between the teeth. The curved diagonal edge of each tooth terminates in a point 19 which is the highest point on each tooth. We provide structure adjacent each point 19 on each tooth which functions as a spreader means, and is designated generally by the numeral 21. This spreader means comprises a downwardly and inwardly extending hook element, or the like 23, each such hook element being directed toward the opposite tooth of a pair of teeth. It will be understood from consideration of the drawings that the construction of these hook elements provides a downwardly and inwardly inclined upper surface 25, or what we shall term a "tooth spreader nose." Each tooth is formed with a perpendicular edge which depends downwardly from the point and to the other longitudinal edge of the elongated opening 9. It is apparent that not only the root 15 of each tooth is of arcuate configuration but that the entire tooth is so shaped.

It will now be appreciated that each tooth is formed with a sharpened diagonal edge and that a tooth spreading means is provided adjacent the point of each tooth, and that such spreading means consists of a hook which extends inwardly and downwardly toward the other tooth of a pair of teeth, and that each hook has an inclined flat upper tooth spreader nose.

FIGS. 1 through 4 of the drawings illustrate how the roll lock plates are constructed or their form prior to be driven into operative position at the joint of a wooden truss. It will be seen that in this condition the teeth are in generally perpendicular relation with respect to the body or base of the plate. FIG. 5, as will be explained, illustrates the spreading movement or action of the teeth which occurs when the plate is driven into the wooden members of the truss at the joints thereof.

Referring to FIG. 5 of the drawings wherein we illustrate a section through a member of the wooden truss it will be seen that a roll lock truss plate is applied to and forced into the member on each side thereof. When the roll lock truss plates 1 are driven into the member M of the wooden truss the spreading nose 25 of the hook 21 adjacent the point of each tooth will cause a spreading action of each tooth, that is the teeth of each pair of teeth will be spread or bent away from each other to provide a larger area A of the wooden member M embraced within each pair of teeth as clearly shown in FIG. 5 of the drawings. This will result as one factor in producing a greater holding characteristic to each pair of teeth and consequently the entire roll lock truss plate. The hook elements 23 not only serve as a tooth spreading means but also function as an anchoring means on each tooth to increase the holding power of the plate.

It will now be appreciated that we have produced a roll lock truss plate which produces less tearing of the wood fiibers of the truss members when it is driven thereinto and greatly increases the holding powers of the plates.

We claim:

A roll lock truss plate comprising a substantially flat metal body having a plurality of pairs of wood penetrating teeth struck therefrom and extending substantially perpendicular to said flat body, the teeth of each pair of teeth being spaced apart, said teeth being arcuate in cross section throughout their axial extent to define a concave surface and a convex surface wtih the concave surfaces of the teeth of each of said pairs facing each other, and each tooth of said pairs of teeth having a bevelled penetrating edge extending from one side edge of said tooth at a point near said flat body to the highest point on said tooth, said penetrating edge extending at an inclined angle with respect to said flat body, and a second side edge of each tooth extending from the flat body substantially perpendicular with respect thereto and intersecting said first named edge at said highest point forming a relatively sharp wood penetrating point on each tooth, each tooth of said pairs of teeth having an anchoring hook formed thereon at said wood penetrating point and each hook inclined downwardly toward said flat body and outwardly in the direction of the other tooth of said pair with the free end of said hook being substantially pointed.

References Cited by the Examiner

UNITED STATES PATENTS

| 66,100 | 6/1867 | McMurtry | 85—31 |
| 3,049,042 | 8/1962 | Lynn | 85—13 |
| 3,090,088 | 5/1963 | Foley et al. | 85—13 |
| 3,104,429 | 9/1963 | Sandford | 85—13 |

FOREIGN PATENTS 16,386  3/1898  Switzerland.

CARL W. TOMLIN, Primary Examiner.

R. S. BRITTS, Assistant Examiner.